(12) United States Patent
Obertrifter et al.

(10) Patent No.: US 6,408,977 B1
(45) Date of Patent: Jun. 25, 2002

(54) HYDRAULIC STEERING SYSTEM FOR A VEHICLE, ESPECIALLY FOR A MOBILE WORKING MACHINE

(75) Inventors: Bernd Obertrifter, Steinfeld; Dieter Roth, Schlüchtern, both of (DE)

(73) Assignee: Mannesmann Rexroth AG, Lohr/Main (DE)

(*) Notice: Subject to any disclaimer, the term of this patent is extended or adjusted under 35 U.S.C. 154(b) by 0 days.

(21) Appl. No.: 09/674,104
(22) PCT Filed: Apr. 15, 1999
(86) PCT No.: PCT/EP99/02531
§ 371 (c)(1), (2), (4) Date: Oct. 19, 2000
(87) PCT Pub. No.: WO99/55573
PCT Pub. Date: Nov. 4, 1999

(30) Foreign Application Priority Data

Apr. 23, 1998 (DE) ......................... 198 18 111

(51) Int. Cl.[7] ............... B62D 5/06; B62D 5/00
(52) U.S. Cl. .................. 180/442; 180/441; 180/417
(58) Field of Search ................. 180/403, 417, 180/421, 441, 443

(56) References Cited

U.S. PATENT DOCUMENTS

| 5,682,744 A | * | 11/1997 | Hasegawa et al. | ............ 60/385 |
| 5,896,943 A | * | 4/1999 | Christensen | ................ 180/442 |
| 5,947,228 A | * | 9/1999 | Rolando | ...................... 180/442 |
| 5,953,978 A | * | 9/1999 | Bohner et al. | .............. 180/442 |
| 6,070,691 A | * | 6/2000 | Evans | ......................... 180/442 |
| 6,202,501 B1 | * | 3/2001 | Ikari | ........................... 74/496 |

FOREIGN PATENT DOCUMENTS

| DE | 3525255 | 1/1986 |
| DE | 4025697 | 2/1992 |
| DE | 4031951 | 4/1992 |
| DE | 4314616 | 3/1994 |
| DE | 4301745 | 6/1994 |
| EP | 0547570 | 6/1993 |
| EP | 0636530 | 2/1995 |

\* cited by examiner

Primary Examiner—Brian L. Johnson
Assistant Examiner—Matthew Luby
(74) Attorney, Agent, or Firm—Martin A. Farber

(57) ABSTRACT

A hydraulic steering system, which is used, in particular, for a mobile working machine, and has a steering unit that can be actuated by a first steering member, which is constructed as a steering wheel, that has a first fluid connection, which is connected to a pressure chamber of a steering motor, the pressure chamber being subjected to pressure for a steering movement to the left, and that has a second fluid connection, which is connected to a pressure chamber of the steering motor, the pressure chamber being subjected to pressure for a steering movement to the right, and which has a control valve that can be actuated by a second steering member, which is constructed in the manner of a joystick, and likewise has fluid connections that are connected to the pressure chambers of the steering motor. There is provided priority for steering with the first steering member over steering with the second steering member, wherein the control valve can be activated only when the steering unit is in the neutral position.

22 Claims, 3 Drawing Sheets

HYDRAULIC STEERING SYSTEM FOR A VEHICLE, ESPECIALLY FOR A MOBILE WORKING MACHINE

FIELD AND BACKGROUND OF THE INVENTION

The invention takes a hydraulic steering system as its starting-point, which is used, in particular, for a mobile working machine.

DE 43 14 616 A1 has disclosed a hydraulic steering system that has a first steering member, which is constructed in the manner of a steering wheel and by means of which a steering unit with a first fluid connection, which is connected to a pressure chamber of a steering motor, said pressure chamber being subjected to pressure for a steering movement to the left, and with a second fluid connection, which is connected to a pressure chamber of the steering motor, said pressure chamber being subjected to pressure for a steering movement to the right, can be actuated. The steering unit comprises, in a known manner, a metering pump and a valve and returns to a neutral position once the rotation of the steering member is finished. The steering unit furthermore allows hydraulic actuation of a control valve, the control chambers of which, which can be subjected to pressure for actuation, can be connected by respective shuttle valves to the working lines leading from the steering unit to the steering motor. In the steering system disclosed in DE 43 14 616 A1, the steering motor furthermore comprises two hydraulic cylinders.

In the steering system disclosed in DE 43 14 616 A1, the control valve can also be actuated by means of a second steering member, which is constructed in the manner of a joystick. This contains two pressure-reducing valves, it being possible for the outlet of one pressure-reducing valve to be connected to one control chamber via one shuttle valve and the outlet of the other pressure-reducing valve to be connected to the other control chamber of the control valve via the other shuttle valve. A connection is in each case established when the control pressure at the outlet of a pressure-reducing valve is higher than the pressure in the working line extending between the steering unit and the steering motor and connected to the same shuttle valve. The two working connections of the control valve are connected to two other pressure chambers of the steering motor.

The two pressure-reducing valves of the second steering member are supplied with control oil from a feed line, in which a substantially constant supply pressure prevails. The feed line leads via a 2/2-way selector valve, which is controlled by the pressures at the two fluid connections of the steering unit and interrupts the feed line when there is a pressure in one of the two fluid connections. This is intended to ensure that steering with the first steering member has priority over steering with the second steering member.

A hydraulic steering system is known from DE 40 31 951 A1. In this hydraulic steering system, the control valve is associated only with the second steering member and cannot be actuated by means of the first steering member. The steering motor is a synchronous-motion cylinder with two pressure chambers, each of which is connected either to a working connection of the steering unit or to a working connection of the control valve. To ensure priority for a steering actuation by means of the first steering member over a steering actuation by means of the second steering member, by means of which the control valve is activated, the two pressure chambers of the steering motor have arranged upstream of them valves that can be moved by the pressure at a working connection of the control valve into a position such that the working connection is connected to the corresponding pressure chamber of the steering motor. A control line, for which the control oil is taken from the respectively pressurized working connection of the control valve, can be relieved to a tank by means of a further valve, which is operated by the pressure at a load-signaling connection of the steering unit. Thus, as soon as a pressure is applied to the load-signaling connection of the steering unit, the control line is relieved and the selector valves at the pressure chambers of the steering motor move into a position in which the connection between the working connections of the control valve and the pressure chambers is shut off and a connection is established between the working connections of the steering unit and the pressure chambers.

SUMMARY OF THE INVENTION

It is an object of the invention to ensure priority of a steering actuation by means of the first steering member over a steering actuation by means of the second steering member in a simple manner in a hydraulic steering system.

According to the invention, this object is achieved in that the control valve can only be activated when the steering unit is in the neutral position. Thus, the control valve cannot then be moved out of a neutral central position, making it unnecessary also to have an expensive means of shutting off its working connections from the steering motor. There is an intervention only in the pilot-control circuit of the control valve, in which the pressures are low and the quantities of oil to be controlled are small.

Advantageous refinements of a hydraulic steering system according to the invention are also provided. The pilot-control signal can usually be generated from a supply signal by pilot-control means adjustable by means of the second steering member. In principle, it is conceivable to intervene in the control lines downstream of the pilot-control means in order to prevent actuation of the control valve. Since there are generally two such control lines, it would be necessary to intervene in both. It seems simpler to switch off the supply signal fed to the pilot-control means.

Nowadays, pilot-controlled directional control valves are predominantly actuated hydraulically or electro-hydraulically. In both cases, the control valve has two control chambers, which can be subjected to control pressure, the directional-control spool of the control valve then being displaced out of a central position against a centering-spring arrangement. If the control valve is adjustable in a proportional manner, the control chambers can be subjected to different control pressures. According to a refinement of the invention there is a cut-off valve, which, in a position that it adopts in the case of priority, interrupts a connection of the pilot-control valves to a control-pressure supply line. In particular, according to another refinement, the cut-off valve relieves its outlet connected to the pilot-control valves to a tank in one position, with the result that the control chambers in the control valve are also relieved of pressure and the directional-control spool of the control valve returns to its central position. All further steering movement due to supply of fluid to the steering motor via the control valve ceases.

So-called load-sensing steering units have a pressure-signaling connection, at which a pressure signal, in particular the load pressure applied to the first or second fluid connection, can be picked off when the steering unit has been adjusted out of the neutral position. According to a feature of the invention, it is advantageously possible for a pilot-control signal to be generated or not by means of the second steering member as a function of this pressure signal. In particular, according to another feature of the invention the selector valve, which, in one position, interrupts a connection of the pilot-control valves to the control-pressure supply line, can be switched over hydraulically directly by the pressure applied to the pressure-signaling connection of the steering unit.

The pilot-control valves can be manually actuable or, alternatively, actuable electrically, in particular by an electromagnet. In the case of electric actuation, the pilot-control means are, according to still another refinement of the invention, advantageously switched off electrically. That is to say, the electric actuator of a pilot-control valve does not receive an electrical control signal if the steering unit is not in its neutral position, despite the fact that the second steering member is actuated. This appears to be a simple solution, especially when the hydraulic system of a mobile working machine in any case already contains a large number of electronic components that also intervene in the steering system.

In such a case, it is superfluous to divert away the supply pressure for the pilot-control valves. However, safety reasons may argue for additionally diverting away the supply pressure as well. The means used for switching off electrically is advantageously a pressure switch, which can be actuated by the pressure applied to the pressure-signaling connection of the steering unit.

According to still another refinement of the invention, provision is made for a movement of the first steering member to be detected by an electric signal transmitter and for the pilot-control means to be capable of being switched off by means of the electric signal transmitter. A construction of this kind is of universal application, even in those steering units which do not have a pressure-signaling connection. Moreover, this solution is, in turn, particularly simple in systems in which a lot of electronics are used.

Particularly for mobile working machines, the hydraulic system of which also comprises electronic controls, e.g. in the form of a microcomputer or microcontroller, it is easy to make the steering rate, which is dependent on the actuating travel of the second steering member in the case of proportional activation of the control valve, dependent on the speed of the vehicle too. For example, the adjustment travel of the control valve can be made progressively smaller as the speed increases by intervention of the microcontroller at a given position of the second steering member. Another and more simple possibility of allowing for the driving speed in the steering rate is, according to a feature of the invention, for only the maximum possible magnitude of the pilot-control signal to be variable as a function of the vehicle speed. This means that, when the second steering member is actuated out of its neutral position, the vehicle speed initially has no effect on the steering rate. After a certain actuating travel, however, the pilot-control signal for the control valve can no longer be increased, even if the second-steering member is moved further. The point at which the control valve can no longer be adjusted further now depends on the vehicle speed. At a high vehicle speed, it is closer to the neutral position of the second steering member than at low vehicle speed. Sharp steering corrections with the second steering member are thus even less possible, the higher the vehicle speed. At the same time, the control can be configured in such a way that the reduction in the maximum steering rate occurs only above a certain minimum speed. The vehicle speed can be detected by means of a speedometer. However, mobile working machines are generally also fitted with driving hydraulics, and a control pressure for the driving hydraulics is a measure of the vehicle speed. This control pressure can now be used to activate a valve by means of which a maximum possible pilot-control pressure can be varied.

A joystick steering facility can also be used on so-called excavator loaders. Nowadays, the pilot-control devices are generally integrated into the rests of the vehicle seat. According to still another feature, the adjustment of the control valve as a function of the actuating direction of the second steering member is reversed by rotation of the driver's seat through 180 degrees, with the result that steering takes place in the appropriate manner in both directions of travel of the excavator loader.

BRIEF DESCRIPTION OF THE DRAWING

A number of exemplary embodiments of a hydraulic steering system according to the invention are illustrated in the form of circuit diagrams. The invention will now be explained in greater detail using these exemplary embodiments.

In the figures of the drawing.

DETAILED DESCRIPTION OF THE PREFERRED EMBODIMENT

Figure 1:
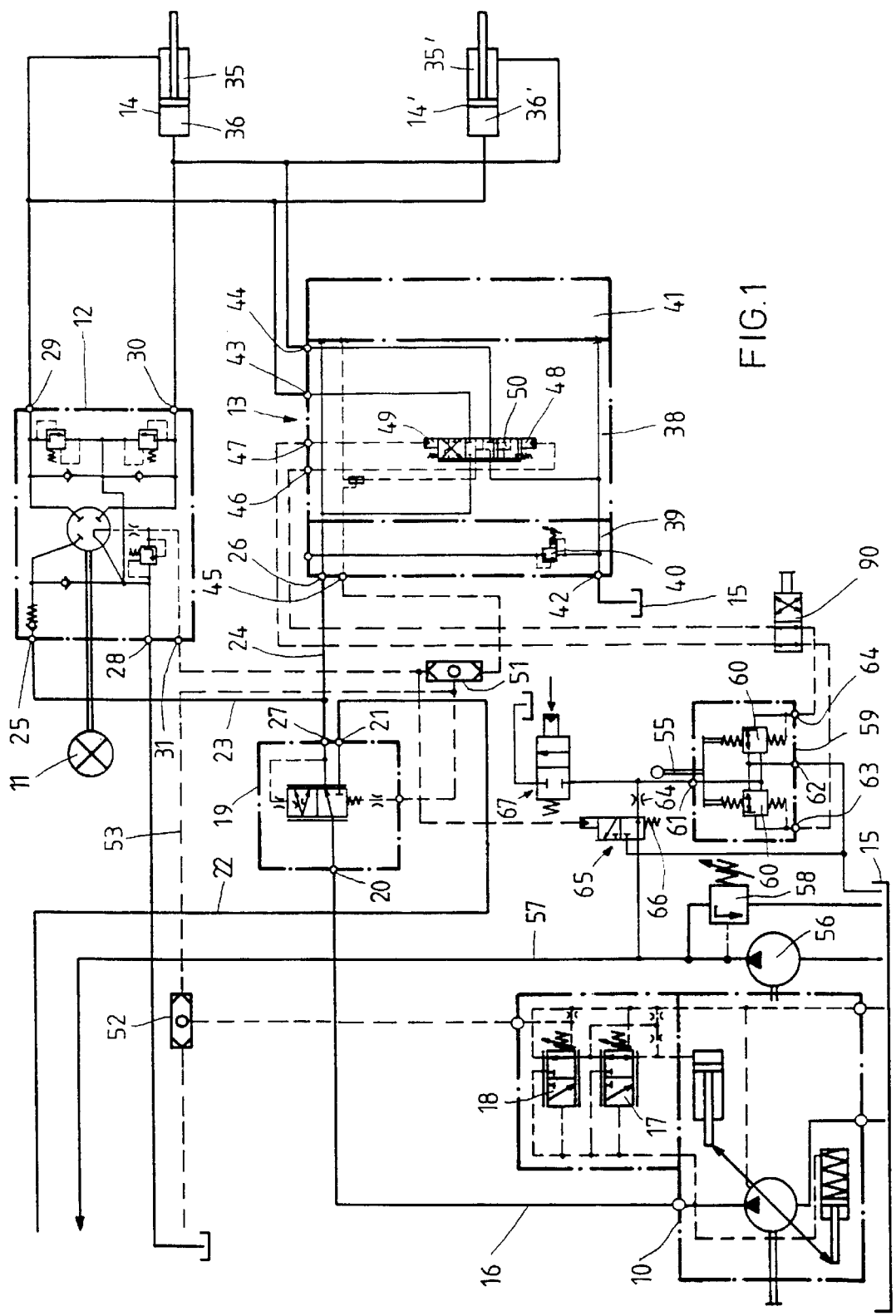
FIG. 1 shows the circuit diagram of the first embodiment, in which the control valve can be actuated by means of a hydraulic pilot-control device and the supply control pressure for the pilot-control device can be diverted away and reduced as a function of the vehicle speed.

All the embodiments shown contain as their main components a variable-displacement pump 10 subject to load-sensing control, a load-sensing steering unit 12 that can be actuated by means of a steering wheel 11, which is to be regarded as the first steering member, a hydraulically pilot-controlled, proportionally adjustable load-sensing control valve 13 with an axially adjustable control spool (not shown specifically), and two steering motors 14 in the form of differential hydraulic cylinders. The two hydraulic cylinders 14 could also be considered jointly as a single steering motor. The variable-displacement pump 10 is driven by an internal combustion engine of a mobile working machine and draws in pressure medium from a tank 15, delivering it into a delivery line 16.

In the embodiment shown in FIG. 1, to which the following description will initially refer, a first regulating valve 17, which limits the pressure in the delivery line 16 to a maximum, and a second regulating valve 18 are mounted in a known manner on the variable-displacement pump 10, the latter valve representing the so-called load-sensing regulator and its regulating piston (not indicated specifically) being acted upon in the direction of an adjustment of the variable-displacement pump in the direction of a higher delivery rate by a compression spring and by the highest load pressure of the hydraulic loads supplied with pressure medium by the variable-displacement pump 10 and being acted upon in the direction of a lower delivery rate by the pressure in the delivery line 16. The compression spring is preloaded in such a way that, at a pressure difference of 10 to 20 bar between the pressure in the delivery line 16 and the highest load pressure, there is an equilibrium of forces at the regulating piston of the regulating valve 18.

The delivery line 16 leads to the inlet 20 of a priority valve 19, connected to the secondary output 21 of which is a supply line 22 leading to a valve group belonging to the working hydraulics of the mobile working machine. The pump connection 25 of the steering unit 12 and the pump connection 26 of the control valve 13 are connected to the primary outlet 27 of the priority valve 19 by branch lines 23 and 24. The regulating piston (not indicated specifically) of the priority valve 19 is acted upon in the direction of a connection of the inlet 20 to the secondary outlet 21 by the pressure in the branch lines 23 and 24 and in the direction of a connection of the inlet 20 to the primary outlet 27 by a compression spring and the highest of the load pressures of the steering motors 14 applied to the pressure-signaling outlets 31 and 45, respectively, of the steering unit 12 and the control valve 13. The compression spring is set in such a way that the difference between the pressure in the branch lines 23 and 24 and the load pressure signaled by the steering unit 12 and the control valve 13 is somewhat less than the difference between the pressure in the delivery line 16 and the highest load pressure.

The steering unit 12 contains a hand pump and a valve that assumes a neutral position after the end of each actuation of the steering wheel, in which position the pump connection 25, a tank connection 28 and two motor connections 29 and 30 of the steering unit 12 are shut off from one another, this being familiar and therefore being illustrated only in a highly schematized way. The motor connection 29 of the steering unit 12 has a fluid connection to the annular pressure chamber 35 at the piston-rod end of one hydraulic cylinder 14 and to the pressure chamber 36' at the opposite end of the hydraulic cylinder 14' from the piston rod. The pressure chambers 35 and 36' are subjected to pressure when a leftward steering movement is to be performed. They are, as it were, the left-hand pressure chambers of the steering motors 14 and 14'. The motor connection 30 of the steering unit 12 has a fluid connection to the annular pressure chamber 35' at the piston-rod end of the hydraulic cylinder 14' and to the pressure chamber 36 at the opposite end of the hydraulic cylinder 14 from the piston rod. The two pressure chambers 36 and 35' are subjected to pressure when the steering is to be turned to the right. They are, as it were, the right-hand pressure chambers of the hydraulic motors 14 and 14'.

As a housing, the control valve 13 has a valve disk 38, which is situated between an inlet disk 39 with a pressure-relief valve 40 and an end plate 41, which closes off various'fluid passages passing through the valve disk 38. A passage that begins at the pump connection 26 of the control valve 13, passes through the inlet disk 39 and to which the inlet of the pressure-relief valve 40 is connected, is continued in the valve disk 38. The inlet disk 39 is also penetrated by a return passage, which is likewise present in the valve disk 38 and emerges on the outside of the inlet disk 39 as a tank connection 42, which is connected to tank 15. Two motor connections 43 and 44 of the control valve 13, of which motor connection 43, together with motor connection 29 of the steering unit 12, is connected to the left-hand pressure chambers 35 and 36' of the steering motors 14 and 14', and motor connection 44, together with motor connection 30 of the steering unit 12, is connected to the right-hand pressure chambers 36 and 35' of the steering motors 14 and 14', are situated on the valve disk 38.

Apart from the above-mentioned working connections 26, 42, 43 and 44, the control valve 13 has further control connections, namely the load-signaling connection 45 already mentioned and two pilot-control connections 46 and 47, which lead to control chambers 48 and 49 in front of the two ends of a spring-centered directional-control spool 50 of the control valve 13, the said spool being adjustable in a proportional manner out of a center position. In the center position, the directional-control spool 50 shuts off the connections 26, 42, 43 and 44 from one another and connects the load-signaling connection 45 to the tank connection 42. By means of a displacement out of the center position, one of the two motor connections 43 and 44 is connected via a metering restrictor to the pump connection 26 and the other motor connection is connected to the tank connection 42, the motor connection concerned depending on the direction of displacement. The pressure downstream of the metering restrictor is picked off and appears at the load-signaling connection 45.

A shuttle valve 51 connects either the load-signaling connection 31 of the steering unit 12 or the load-signaling connection 45 of the control valve 13 to a section 53 of a load-signaling line that leads to a further shuttle valve 52, which transmits either the load pressure of the steering hydraulics or of the working hydraulics to the regulating valve 18 of the variable-displacement pump 10, whichever is higher. One side of the priority valve 19 is connected to the outlet of the shuttle valve 51.

Like the control valve 13, the individual valves of the working hydraulics are also actuated in a purely hydraulic manner. The control oil required for this purpose is pumped by a control-oil pump 56 into a control line 57, in which a pressure of, for example, 30 bar is maintained by a pressure-relief valve 58, this pressure corresponding to the maximum pilot-control pressure. Via the control line 57, a hydraulic pilot-control device (not shown specifically) of the working hydraulics and a hydraulic pilot-control device 59 of the steering hydraulics, said device being actuable by means of a hand lever (joystick 55), are supplied with control oil. The pilot-control device 59 contains two pressure-reducing valves 60 that can be adjusted by means of the hand lever, have a common pressure connection 61, a common tank connection 62 and respective control connections 63 and 64, which are each connected to one of the control chambers 48 and 49 of the control valve 13. Which control connection 63, 64 is connected to which control chamber 48, 49 depends on the position of a changeover valve 90, which is switched during a rotation of the vehicle seat through 180 degrees and ensures steering in accordance with the deflection of the joystick. The pressure connection 61 of the pilot-control device 59 is connected via a restrictor 64 to a connection of a cut-off valve 65, which, under the action of a spring 68, assumes a rest position, in which said connection is connected to the control line 57, and which can be moved hydraulically, by the pressure at the load-signaling connection 31 of the steering unit, into a position in which the control line 57 is shut off from the pressure connection 61 of the pilot-control device 59 and the pressure connection 61 is relieved to the tank. The selector valve 65 is switched over at a very low load pressure. Connected to the connection between the restrictor 64 and the pressure connection 61 is a throttle valve 67 that can be adjusted in a proportional manner by a control pressure of the driving hydraulics of the mobile working machine and opens a throttle between the pressure connection 61 and the tank wider, the higher the control pressure in the driving hydraulics. As a result, the maximum control pressure at the pressure connection 61 falls below the value in the control line 57.

When the steering unit 12 or control valve 13 is actuated, a load pressure is signaled to the variable-displacement pump 10, which slews out to such an extent that a pump pressure that is higher by ascertain Δp prevails in the delivery line 16. The quantity of fluid that the priority valve 19 allows to pass through from the delivery line 16 into the branch lines 23 and 24 is such that a pressure that is higher than the load pressure by a certain Δp prevails in them. Depending on the direction of motion, a movement of the steering member 11 connects either the motor connection 29 or the motor connection 30 to the pump connection 25, thereby directing pressure medium into the corresponding pressure chambers of the hydraulic cylinders 14 and 14'. Pressure medium is displaced from the other pressure chambers and returned to the tank via the steering unit 12 and its tank connection 28. If the steering wheel 11 is held in a particular position, the connections 25, 28, 29 and 30 are separated from one another again by the steering unit 12.

For the purpose of steering by means of the control valve 13, the pilot-control device 59 is actuated and, as a result, a control pressure, by means of which the directional-control spool 50 is moved out of its central position, builds up in one of the two control chambers 48 or 49. Depending on the direction of steering, either motor connection 43 or 44 is connected to the pump connection 26, and the other motor connection is connected to the tank connection 42, with the result that corresponding pressure chambers of the hydraulic cylinders 14 and 14' are subjected to pressure and the other pressure chambers are relieved of pressure. If the pilot-control device 59 is actuated during a turning movement of the steering wheel 11, no pilot-control pressure can be built up in one of the control chambers 48 and 49 of the control valve 13. This is because the load pressure required to move the pistons of the steering cylinders 14 and 14', which moves the selector valve 65 into a position in which the pressure connection 61 of the pilot-control device 59 is relieved to the tank, is applied to the load-signaling connection 31 of the steering unit 12 while the steering wheel 11 is being turned. While the steering wheel 11 is being moved, it is thus not possible to steer the vehicle by means of the pilot-control device 59. Steering via the steering wheel 11 has priority.

The behavior of the steering is different when using the joystick 55 of the pilot-control device 59 than that when using the steering wheel 11. When steering with the latter, the steer angle changes for as long as the steering wheel is being moved. When the turning of the steering wheel ceases, the steer angle remains constant. The direction of turning of the steering wheel determines the direction of the steering movement from the instantaneous position of the steered wheels or, in other words: the direction of motion of the pistons of the steering cylinders 14 and 14' is determined by the direction of turning of the steering wheel 11. In the case of steering by means of the joystick 55, on the other hand, the steer angle continues to change in the same direction for as long as the joystick of the pilot-control device 55 remains on the same side of a neutral position. Even if the joystick is at rest in this position, the steer angle continues to increase to the right or left. The magnitude of the deflection of the joystick out of its neutral position influences only the rate of change of the steer angle. The further the joystick is deflected, the more rapid is the steering movement. Since very high steering rates are thus achieved by maximum deflection of the joystick after a small actuating travel in comparison with the turning of a steering wheel, the maximum steering rate possible by means of the joystick is limited as a function of the vehicle speed in order to prevent the occurrence of dangerous situations. The throttle valve 67 is used for this purpose. This limits the maximum pilot-control pressure to smaller values, the higher the vehicle speed. Only this lower value of a pilot-control pressure can be fed into a control chamber of the control valve 13 at maximum deflection of the joystick 55 of the pilot-control device 59, with the result that the deflection of its directional-control spool 50 and hence the aperture cross section of the metering restrictor are also limited. The behavior of the system is such that, in the case of small deflections of the joystick, the steering rate is independent of the vehicle speed and, above a certain vehicle-speed-dependent degree of deflection of the joystick, the steering rate can no longer be increased.

Figure 2:
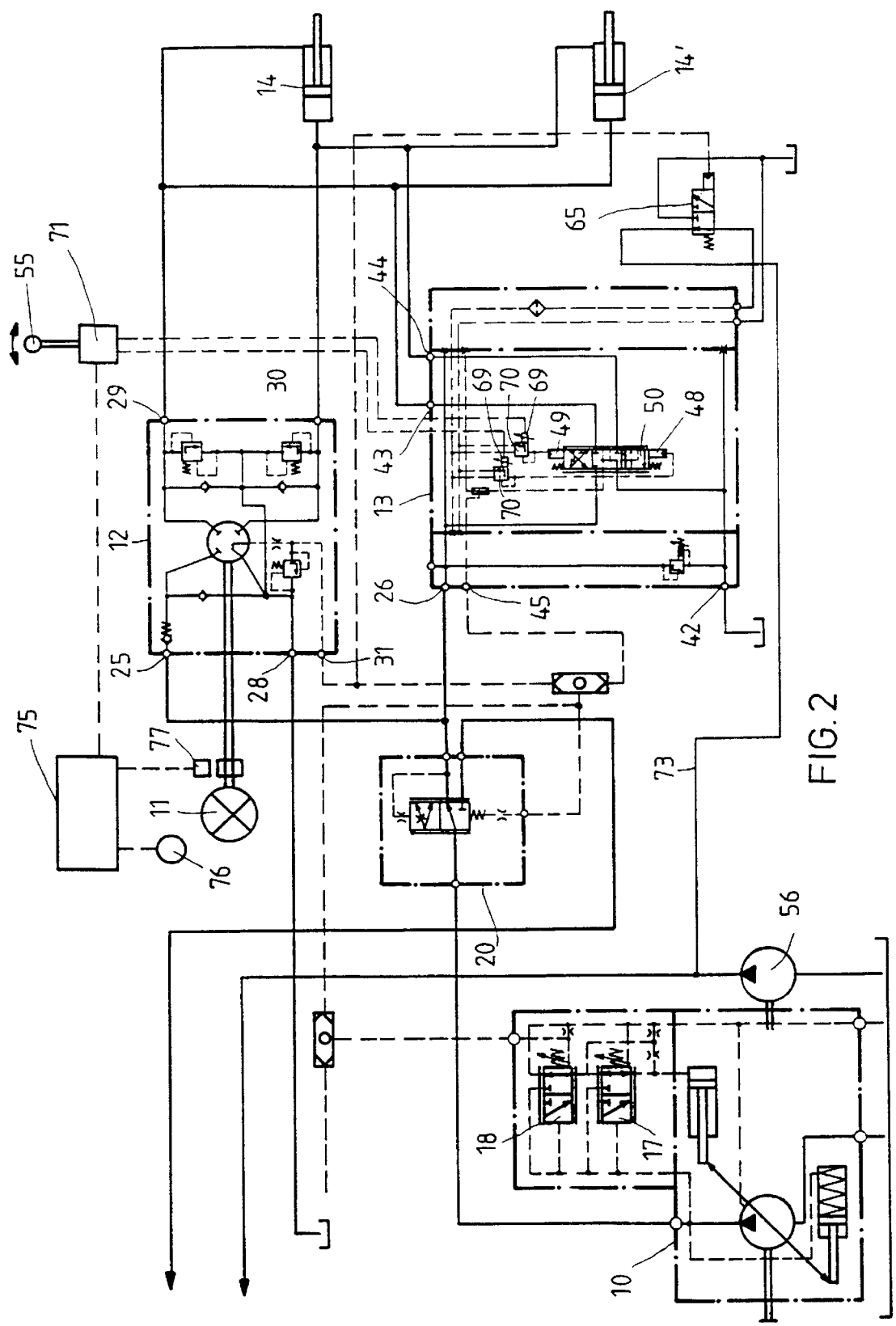
FIG. 2 shows the second embodiment, which contains a microcontroller, by which an electric pilot-control device for the control valve is supplied with power and to which a signal from a sensor that detects movement of the first steering member can be fed.

As regards the variable-displacement pump 10 with the regulating valves 17 and 18, the priority valve 20, the steering unit 12 and the steering wheel 11 and as regards the control valve 13 and steering cylinders 14 and 14', the embodiment in FIG. 2 corresponds largely to the embodiment in FIG. 1. Only the differences will therefore be referred to below. The control valve 13 is now not actuable in a purely hydraulic manner but is electrohydraulically actuable. This means that each control chamber 48 and 49 has arranged upstream of it a pressure-reducing valve 70 that can be adjusted by means of an electromagnet, the proportional magnets 69 being activated by means of a joystick 55 via an electric pilot-control device 71. The pressure-reducing valves 70 are once again supplied with control oil by a control-oil pump 56, from which a control line 73 leads to a cut-off valve 65 that connects the pressure inlets of the pressure-reducing valves 70 to the control line 73 in a rest position and relieves them to the tank in an activated position. The cut-off valve 65 is switched by a load pressure applied to the load-signaling connection 31 of the steering unit 12.

The pilot-control device 71 is connected to a microcontroller 75 that supplies-the pilot-control device 71 with a maximum control voltage, from which a control voltage for one of the two electromagnets 69 is generated by means of the pilot-control device 71, this control voltage increasing with the deflection of the joystick 55. The microcontroller 75 receives signals from a tachogenerator 76 that detects the speed of the vehicle and from a sensor 77 that detects directly whether the steering wheel 11 is being turned or not or is a position sensor, from the signal of which the microcontroller detects whether the steering wheel 11 is in motion or at rest from the time derivative.

As soon as the microcontroller 75 detects motion of the steering wheel 11, it switches off the power supply to the pilot-control device 71, with the result that the latter can no longer transmit a control signal to the electromagnets 69. Actuation of the control valve 13 is then not possible. As a function of the signal that it receives from the tachogenerator 76, the microcontroller varies the power supply to the pilot-control device 71 in such a way that, as the vehicle speed increases, said device can transmit an increasingly smaller maximum control signal to an electromagnet 69. Depending on the construction of the pilot-control device 71, the dependence between the vehicle speed and the control signal can be such that, up to a certain deflection of the joystick 72 dependent on the vehicle speed, the control signal remains unaffected by the vehicle speed and can then no longer be increased, as in the embodiment shown in FIG. 1. However, it is also possible for a pilot-control signal for an electromagnet to continue changing up to the maximum deflection of the joystick 55 but for the pilot-control signal for a particular deflection to be increasingly reduced as the speed increases.

Figure 3:
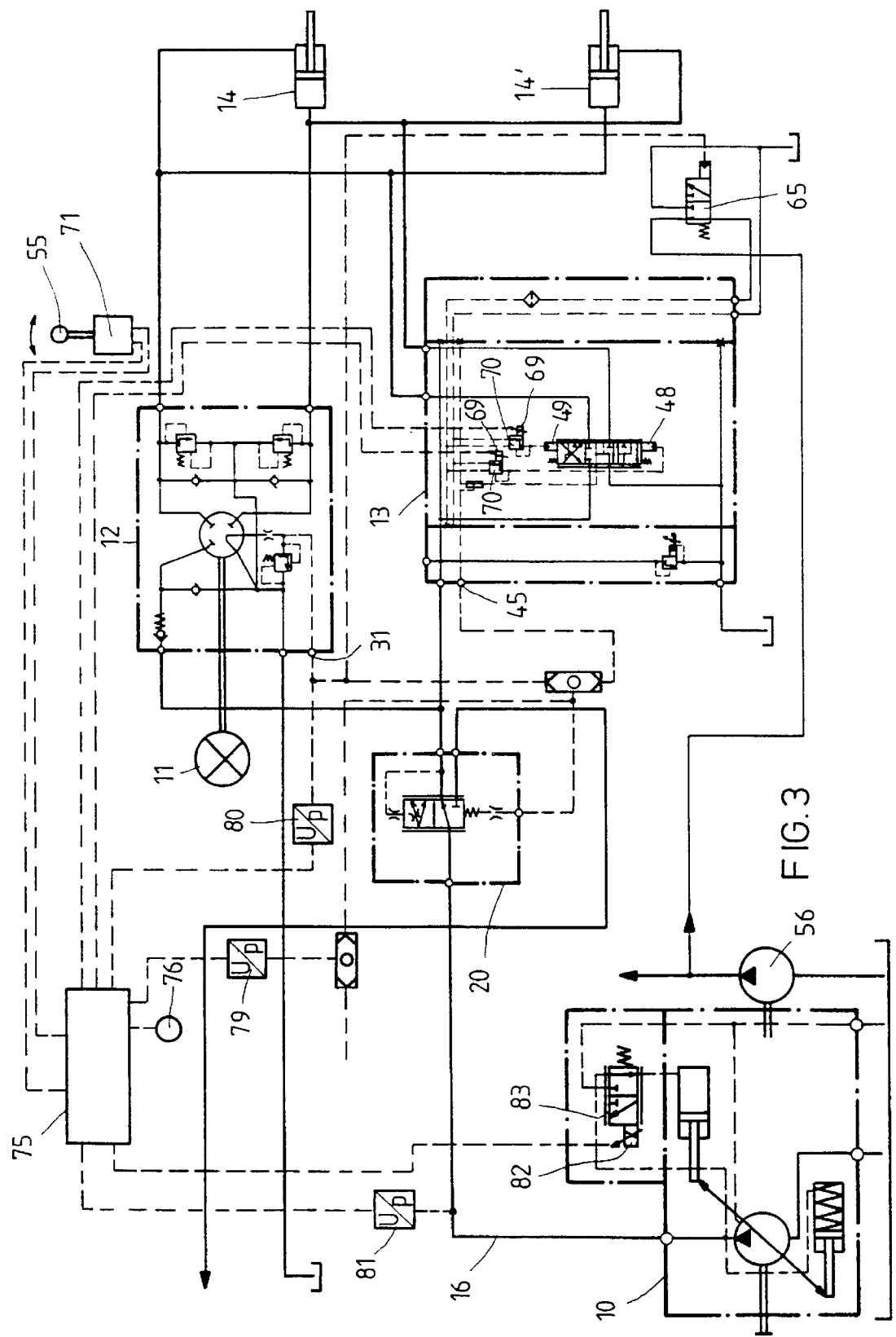
FIG. 3 shows the third embodiment, which, like that in FIG. 2, contains a microcontroller, although the latter is supplied with the signal from a pressure sensor that detects a load pressure.

As regards the variable-displacement pump 10 and the control-oil pump 56, the priority valve 20, the steering unit 12 and steering wheel 11, the control valve 13 and electromagnetically actuable pilot-control valves 70, the cut-off valve 65 and the steering motors 14 and 14', the embodiment in FIG. 3 corresponds fully to the embodiment in FIG. 2.

As with the embodiment in FIG. 2, there is a microcontroller 75, which is supplied with signals from the following devices or sensors: from a tachogenerator 76, by means of which the speed of the vehicle is detected; from a pressure sensor 79, which emits an electrical signal corresponding to the highest load pressure (load pressure at the load-signaling connection 31 of the steering unit 12 or at the load-signaling connection 45 of the control valve 13 or the highest load pressure of the working hydraulics); from a pressure sensor 80, which detects a load pressure at the load-signaling connection 31 of the steering unit 12; from a pressure sensor 81, which detects the pressure in the delivery line 16 and emits a signal corresponding to this pressure. The microcontroller 75 also receives electrical signals from the two outputs of the electric pilot-control device 71. The microcontroller 75 emits control signals to the two electromagnets 69 of the pilot-control valves 70 and to an electromagnet 82 of a 3/2-way valve 83 that can be adjusted in a proportional manner, is mounted on the variable-displacement pump 10 and replaces the two regulating valves 17 and 18 in FIGS. 1 and 2. The microcontroller 75 controls the valve 83 in such a way that there is a certain difference between the pressures detected by the pressure sensors 79 and 81. This gives load-sensing regulation. Above a limiting pressure in the delivery line 16, the microcontroller 75 controls the valve 83 in such a way that the pressure in the delivery line 16 does not increase further. Pressure limitation is thereby achieved.

When the pilot-control device 71 is actuated by means of the joystick 55, the microcontroller 75 only emits a control signal to one of the electromagnets 69 if no load pressure is detected at the load-signaling connection 31 of the steering unit 12 by the pressure sensor 80. Steering by means of the pilot-control device 71 and the control valve 13 is thus not possible while the steering wheel 11 is being turned.

A control signal emitted by the microcontroller 75 to an electromagnet 69 is modified as a function of the signal received from the tachogenerator 76. The higher the vehicle speed, the smaller the control signal transmitted by the microcontroller 75 to the corresponding electromagnet 69 at a given deflection of the joystick 55. Widely differing relationships between the control signals and the vehicle speed are possible here, depending on the programming of the microcontroller.

In the embodiments shown in FIGS. 2 and 3, the cut-off valve 65 is not necessary for the basic functioning of the hydraulic system since, when the steering wheel 11 is turned, the pressure-reducing valves 70 remain in a position or return to a position in which the control chambers 48 and 49 of the control valve 13 are connected to the tank, bypassing the valve 65. To this extent, the cut-off valve 65 thus only provides additional security for the priority of steering by means of the steering wheel 11 over steering with the joystick 55.

We claim:
1. A hydraulic steering system for a mobile working machine, with a steering unit (12) that can be adjusted out of a neutral position by a first steering member (11), which is constructed as a steering wheel, that has a first fluid connection (29), which is connected to a (left-hand) pressure chamber (35, 36') of a steering motor (14, 14'), said pressure chamber being subjected to pressure for a steering movement to the left, and that has a second fluid connection (30), which is connected to a (right-hand) pressure chamber (36, 35') of the steering motor (14, 14'), said pressure chamber being subjected to pressure for a steering movement to the right, with a second steering member (55), which is constructed as a joystick and by which a pilot-control means (59, 71) can be adjusted and a pilot-control signal can be produced, and with a control valve (13) that has an axially movable valve spool (50) and can be activated only by the pilot-control signal and has another first fluid connection (43), which is connected to the left-hand pressure chamber (35, 36') of the steering motor (14, 14'), and another second fluid connection (44), which is connected to the right-hand pressure chamber (36, 35') of the steering motor (14, 14'), wherein the control valve (13) can only be activated when the steering unit (12) is in the neutral position.

2. The hydraulic steering system as claimed in claim 1, wherein the first fluid connections (29, 43) of the steering unit (12) and the control valve (13) are connected to the same said left-hand pressure chamber (35, 36') and the second fluid connections (30, 44) of the steering unit (12) and of the control valve (13) are connected to the same said right-hand pressure chamber (36, 35') of the steering:motor (14, 14').

3. The hydraulic steering system as claimed in claim 1, wherein the pilot-control signal is generatable from a supply signal by the pilot-control means (59, 71) that is adjustable by the second steering member (55), and the supply signal is only applied to the pilot-control means (59, 71) when the steering unit (12) is in the neutral position.

4. The hydraulic steering system as claimed in claim 1, wherein the control valve (13) is adjustable out of a neutral position in one direction by subjecting a first control chamber (48) to a control pressure and in another direction by subjecting a second control chamber (49) to a control pressure, and wherein a control chamber (48, 49) is subjectable to control pressure only when the steering unit (12) is in the neutral position.

5. The hydraulic steering system as claimed in claim 3, wherein the control valve (13) is adjustable out of a neutral position in one direction by subjecting a first control chamber (48) to a control pressure and in another direction by subjecting a second control chamber (49) to a control pressure, and wherein a control chamber (48, 49) is subjectable to control pressure only when the steering unit (12) is in the neutral position and wherein a pilot-control valve (60, 70), which is constructed as an adjustable pressure valve, is connected to said control chamber (48, 49) of the control valve (13) and as a function of position of which the control chamber (48, 49) is subjectable to a control pressure, and by a cut-off valve (65), which is switched as a function of a movement of the first steering member (11) and, in one position, interrupts a connection between the pilot-control valve (60, 70) and a control-pressure supply line (57).

6. The hydraulic steering system as claimed in claim 5, wherein the cut-off valve (65) relieves its outlet connected to the pilot-control valve (60, 70) to a tank (15) in one position.

7. The hydraulic steering system as claimed in claim 3, wherein the steering unit (12) has a pressure-signaling connection (31), to which a pressure signal of the load pressure applied to the first or second fluid connection (29, 30), is applied only when the steering unit (12) has been adjusted out of the neutral position, and said pilot-control signal is generatable or not by the second steering member (55) as a function of said pressure signal.

8. The hydraulic steering system as claimed in claim 5, wherein the steering unit (12) has a pressure-signaling connection (31), to which a pressure signal of the load pressure applied to the first or second fluid connection (29, 30), is applied only when the steering unit (12) has been adjusted out of the neutral position, and said pilot-control signal is generatable or not by the second steering member (55) as a function of said pressure signal, and wherein the cut-off valve (65) can be switched over hydraulically by the pressure applied to the pressure-signaling connection (31) of the steering unit (12).

9. The hydraulic steering system as claimed in claim 1, wherein the pilot-control means (71) can be switched off electrically.

10. The hydraulic steering system as claimed in claim 9, wherein the steering unit (12) has a pressure-signaling connection (31), to which a pressure of the load pressure applied to the first or second fluid connection (29, 30), is applied only when the steering unit (12) has been adjusted out of the neutral position, and the pilot-control means (71) can be switched off by an electric pressure switch (80), which is actuatable by a pressure applied to the pressure-signaling connection (31) of the steering unit (12).

11. The hydraulic steering system as claimed in claim 1, wherein a movement of the first steering member (11) is detectable by an electric signal transmitter (77) and the pilot-control means (71) can be switched off by the electric signal transmitter (77).

12. The hydraulic steering system as claimed in claim 9, wherein the pilot-control valve (70) is adjustable by an electromagnet (69), and the electromagnet (69) can only be activated by the second steering member (55) when the steering unit (12) is in said neutral position and the first steering member (11) is at rest.

13. The hydraulic steering system, as claimed in claim 1, wherein dependence between the pilot-control signal and actuating travel of the second steering member (55) is variable such that, at a specified position of the second steering member (55), steering rate is lower at a higher vehicle speed than at a lower vehicle speed.

14. The hydraulic steering system as claimed in claim 13, wherein only maximum possible magnitude of the pilot-control signal is variable as a function of vehicle speed.

15. The hydraulic steering system as claimed in claim 14, wherein maximum control pressure prevailing in a control-pressure supply line connected to a pilot-control valve (60) is variable as a function of the vehicle speed.

16. The hydraulic steering system as claimed in claim 15, further comprising a valve (67) that is adjustable as a function of the vehicle speed and on position of which the maximum control pressure prevailing in the control-pressure supply line depends is connected to the control-pressure supply line.

17. The hydraulic steering system as claimed in claim 16, wherein the valve (67) is adjustable by a variable control pressure, by which driving hydraulics of the vehicle can be controlled.

18. The hydraulic steering system, according to claim 1, wherein the second steering member (55) is secured on a driver's seat that is rotatable through 180 degrees, and adjustment of the control valve (13) as a function of actuating direction of the second steering member (55) is reversed by rotation of the driver's seat through 180 degrees.

19. The hydraulic steering system as claimed in claim 3, and wherein a pilot-control valve (60, 70), which is constructed as an adjustable pressure valve, is connected to a control chamber (48, 49) of the control valve (13) and as a function of position of which the control chamber (48, 49) is subjectable to a control pressure, and by a cut-off valve (65), which is switched as a function of a movement of the first steering member (11) and, in one position, interrupts a connection between the pilot-control valve (60, 70) and a control-pressure supply line (57).

20. The hydraulic steering system as claimed in claim 4, and wherein a pilot-control valve (60, 70), which is constructed as an adjustable pressure valve, is connected to said control chamber (48, 49) of the control valve (13) and as a function of position of which the control chamber (48, 49) is subjectable to a control pressure, and by a cut-off valve (65), which is switched as a function of a movement of the first steering member (11) and, in one position, interrupts a connection between the pilot-control-valve (60, 70) and a control-pressure supply line (57).

21. The hydraulic steering system as claimed in claim 19, wherein the steering unit (12) has a pressure-signaling connection (31), to which a pressure signal, in particular the load pressure applied to the first or second fluid connection (29, 30), is applied only when the steering unit (12) has been adjusted out of the neutral position, and said pilot-control signal is generatable or not by the second steering member (55) as a function of said pressure signal, and wherein the cut-off valve (65) can be switched over hydraulically by the pressure applied to the pressure-signaling connection (31) of the steering unit (12).

22. The hydraulic steering system as claimed in claim 20, wherein the steering unit (12) has a pressure-signaling connection (31), to which a pressure signal, of the load pressure applied to the first or second fluid connection (29, 30), is applied only when the steering unit (12) has been adjusted out of the neutral position, and said pilot-control signal is generatable or not by the second steering member (55) as a function of said pressure signal, and wherein the cut-off valve (65) can be switched over hydraulically by the pressure applied to the pressure-signaling connection (31) of the steering unit (12).

* * * * *